United States Patent
Cefkin

(10) Patent No.: US 11,119,502 B2
(45) Date of Patent: Sep. 14, 2021

(54) VEHICLE CONTROL SYSTEM BASED ON SOCIAL PLACE DETECTION

(71) Applicant: Nissan North America, Inc., Franklin, TN (US)

(72) Inventor: Melissa Cefkin, San Jose, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 195 days.

(21) Appl. No.: 15/253,565

(22) Filed: Aug. 31, 2016

(65) Prior Publication Data

US 2018/0059683 A1    Mar. 1, 2018

(51) Int. Cl.
*G05D 1/02* (2020.01)
*G05D 1/00* (2006.01)

(52) U.S. Cl.
CPC ......... G05D 1/0285 (2013.01); G05D 1/0088 (2013.01); *G05D 2201/0212* (2013.01)

(58) Field of Classification Search
CPC ..... G06F 2203/04803; G06F 17/30241; G06F 19/345; G06F 3/04847; G05D 1/0088; G05D 2201/0213; G05D 23/1904; G05D 1/0212; G05D 1/0022; G05D 1/0285; G05D 2201/0212; G05D 1/0274; G05D 1/0278; G05D 1/0027; G05D 23/1917; H04L 67/22; H04L 7/18; H04L 51/32; H04L 7/10; H04L 67/26
See application file for complete search history.

(56) References Cited

U.S. PATENT DOCUMENTS

| 8,406,998 B2 * | 3/2013 | Shaffer | G08G 1/096811 |
| | | | 701/414 |
| 8,473,152 B2 * | 6/2013 | Zilka | G06F 17/00 |
| | | | 701/36 |
| 8,509,982 B2 * | 8/2013 | Montemerlo | G06K 9/00805 |
| | | | 701/26 |
| 8,768,867 B1 * | 7/2014 | Thaeler | G06Q 30/02 |
| | | | 706/12 |
| 8,831,813 B1 | 9/2014 | Ferguson et al. | |
| 8,930,059 B2 | 1/2015 | Neff | |

(Continued)

OTHER PUBLICATIONS

"Google Self-Driving Car Project", https://www.google.com/selfdrivingcar/how/, available prior to Aug. 31, 2016.

(Continued)

*Primary Examiner* — Luis A Martinez Borrero
(74) *Attorney, Agent, or Firm* — Global IP Counselors, LLP

(57) ABSTRACT

A vehicle control system includes a communication device, a sensor and a controller. The communication device is configured to receive information from at least one of a mobile application connected to the host vehicle and a local knowledge source. The sensor is configured to detect external conditions in a vicinity of the host vehicle equipped with the vehicle control system. The controller is programmed to detect a social place based on the information from at least one of the mobile application connected to the vehicle and the local knowledge source, to select a driving mode based on the social place that was detected, and to control the host vehicle based on the driving mode that was selected.

22 Claims, 7 Drawing Sheets

(56) References Cited

U.S. PATENT DOCUMENTS

| | | | |
|---|---|---|---|
| 8,963,740 B2* | 2/2015 | Koukoumidis | G08G 1/143 340/932.2 |
| 9,147,298 B2* | 9/2015 | Ricci | G06K 9/00268 |
| 9,268,332 B2* | 2/2016 | Montemerlo | G06T 7/74 |
| 9,283,964 B2* | 3/2016 | Kim | B60W 30/182 |
| 9,294,459 B2* | 3/2016 | Baade | H04W 12/06 |
| 9,330,571 B2 | 5/2016 | Ferguson et al. | |
| 9,554,258 B2* | 1/2017 | Harber | H04L 67/12 |
| 9,658,620 B1* | 5/2017 | Urmson | G01S 17/86 |
| 9,754,490 B2* | 9/2017 | Kentley | G05D 1/0088 |
| 9,963,145 B2* | 5/2018 | Penilla | H04W 4/40 |
| 10,351,139 B2* | 7/2019 | Christensen | G05D 1/0061 |
| 2008/0234929 A1* | 9/2008 | Watson | G01C 21/00 701/408 |
| 2009/0204320 A1* | 8/2009 | Shaffer | G01C 21/3415 701/533 |
| 2012/0054035 A1* | 3/2012 | Nam | G06Q 10/047 705/14.58 |
| 2012/0059534 A1* | 3/2012 | Zilka | H04M 1/72436 701/2 |
| 2013/0345961 A1* | 12/2013 | Leader | G01C 21/3617 701/410 |
| 2014/0005847 A1* | 1/2014 | Melen | G06Q 10/047 700/291 |
| 2014/0005848 A1* | 1/2014 | Melen | G06Q 10/06311 700/291 |
| 2014/0201276 A1* | 7/2014 | Lymberopoulos | G06Q 30/0205 709/204 |
| 2014/0222321 A1* | 8/2014 | Petty | G01C 21/3492 701/117 |
| 2014/0266800 A1* | 9/2014 | Koukoumidis | G08G 1/146 340/932.2 |
| 2015/0032366 A1* | 1/2015 | Man | H04W 4/024 701/412 |
| 2015/0149017 A1* | 5/2015 | Attard | B60W 30/18163 701/23 |
| 2015/0149545 A1* | 5/2015 | Kim | H04L 67/18 709/204 |
| 2015/0166076 A1* | 6/2015 | Kim | B60W 30/182 701/36 |
| 2015/0314780 A1 | 11/2015 | Stenneth et al. | |
| 2015/0346718 A1 | 12/2015 | Stenneth | |
| 2016/0009291 A1* | 1/2016 | Pallett | B60W 50/085 701/23 |
| 2016/0068103 A1* | 3/2016 | McNew | B60W 30/12 701/23 |
| 2016/0068156 A1* | 3/2016 | Horii | B60W 30/0956 701/28 |
| 2016/0080438 A1* | 3/2016 | Liang | G06F 16/9537 715/753 |
| 2016/0082953 A1 | 3/2016 | Teller et al. | |
| 2016/0282132 A1* | 9/2016 | Bostick | G08G 1/012 |
| 2016/0300151 A1* | 10/2016 | Bostick | G08G 1/096838 |
| 2016/0320199 A1* | 11/2016 | Chen | G01C 21/3664 |
| 2016/0323233 A1* | 11/2016 | Song, II | G08G 1/0141 |
| 2017/0008523 A1* | 1/2017 | Christensen | G05D 1/0278 |
| 2017/0048664 A1* | 2/2017 | Zhang | H04L 67/22 |
| 2017/0059337 A1* | 3/2017 | Barker | G01C 21/362 |
| 2017/0126810 A1* | 5/2017 | Kentley | G06Q 50/30 |
| 2018/0203451 A1* | 7/2018 | Cronin | G05D 1/0088 |

OTHER PUBLICATIONS

"Driverless Car Projects that May Change How the World Travels", http://www.govtech.com/videos/3-Driverless-Car-Projects-that-May-Change-How-the-World-Travels.html, H Collins dated Oct. 14, 2014.

"Driving Disrupted: Driverless Cars Change Everything", http://www.slideshare.net/sparksandhoney/autonomous-slideshare-pdf, sparks & honey dated Oct. 15, 2014.

* cited by examiner

VEHICLE CONTROL SYSTEM BASED ON SOCIAL PLACE DETECTION

BACKGROUND

Field of the Invention

The present invention generally relates to a vehicle control system and method for controlling a vehicle based on social place detection. More specifically, the present invention relates to a vehicle control system that detects a social place based on information from a mobile application connected to the vehicle and/or a local knowledge source, selects a driving mode based on the detected social place, and control the vehicle based on the selected driving mode.

Background Information

Conventional autonomous vehicle control systems use sensors to detect certain conditions around the vehicle and then control the vehicle based on the information from the vehicle sensors. For example, some conventional autonomous vehicle control systems classify objects around the car based on information such as the size, shape and movement pattern of the object as detected by the sensor. These conventional systems predict what the objects will do based on the sensor information and then choose a safe speed or trajectory for the car based on the prediction. Additional conventional autonomous vehicle control systems can control a vehicle in a specific driving mode, such as "kid mode," for short distances with limited navigation controls. Other conventional autonomous vehicle control systems can select a driving mode based on the identity of the operator of the vehicle and control the vehicle based on the selected driving mode.

SUMMARY

It has been discovered that in order to improve the socially acceptable driving for autonomous or "driverless" vehicles, an improved autonomous vehicle control system is needed.

In particular, human operators are often familiar with a given locale can understand the type of driving that is appropriate at different times of day for the given locale (i.e., rush hour driving during the work week in a busy downtown area with many pedestrians versus the appropriate driving conditions in the same area on the weekend, or driving in an area when there is a concert or sporting event nearby versus driving in that same area when there is no large public event occurring). However, conventional autonomous or "driverless" vehicle control systems do not account for these differences or otherwise have the capability of detecting the type of social place or environment in which a vehicle is driving and controlling or adjusting the behavior of the vehicle based on the detected social place.

Instead, some conventional systems set a driving mode based on the identity of a driver regardless of the social place or the socially appropriate driving for the locale in which the vehicle is driving. Similarly, some conventional systems control a vehicle based on information from sensors, but fail to account for conditions in a local environment in advance of actually detecting an object near the vehicle like a human operator would. Thus, such conventional systems are limited to merely reacting to objects in the vicinity of the vehicle rather than determining socially appropriate driving conditions upon entering a certain locale. Therefore, it is desirable for an autonomous vehicle control system to have a higher "social intelligence" to more closely replicate a human driver.

This improved autonomous vehicle control system should automatically detect the socially appropriate driving behavior in a given locale at a given time based on information through multiple data and information sources. Moreover, this system should control the vehicle based on the detected socially appropriate driving behavior.

In view of the state of the known technology, one aspect of the present disclosure is to provide a vehicle control system configured to be disposed on a host vehicle. The vehicle control system includes a communication device, a sensor and a controller. The communication device is configured to receive information from at least one of a mobile application connected to the host vehicle and a local knowledge source. The sensor is configured to detect external conditions in a vicinity of the host vehicle equipped with the vehicle control system. The controller is programmed to detect a social place based on the information from at least one of the mobile application connected to the vehicle and the local knowledge source, select a driving mode based on the social place that was detected, and control the host vehicle based on the driving mode that was selected.

Another aspect of the present disclosure is to provide a vehicle control method. The vehicle control method includes detecting a social place based on at least one of a local knowledge source and a mobile application connected to a host vehicle, selecting a driving mode based on the social place that was detected, and controlling the host vehicle based on the driving mode that was selected.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
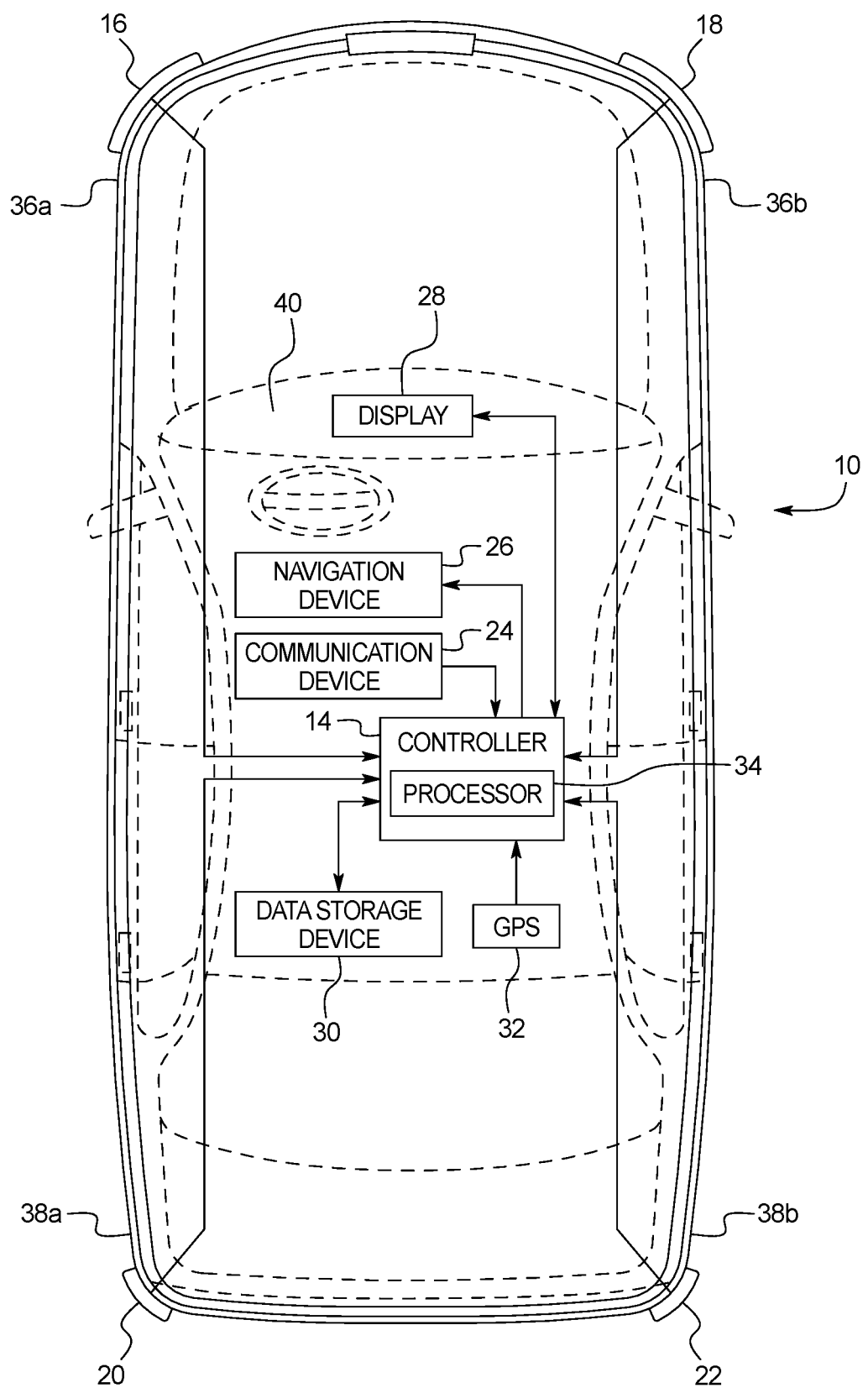
FIG. 1 is a schematic view of a vehicle with a vehicle control system according to one embodiment.

Referring initially to FIG. 1, a vehicle 10 is illustrated that is equipped with a vehicle control system 12 in accordance with a first embodiment. The vehicle 10 constitutes a host vehicle that is equipped with the vehicle control system 12. Thus, hereinafter, the vehicle 10 will be referred to as the host vehicle 10. The host vehicle 10 is preferably an autonomous vehicle, but can be any suitable vehicle. The vehicle control system 12 has a plurality of predetermined driving modes that control the vehicle based on a detected social place.

Figure 2:
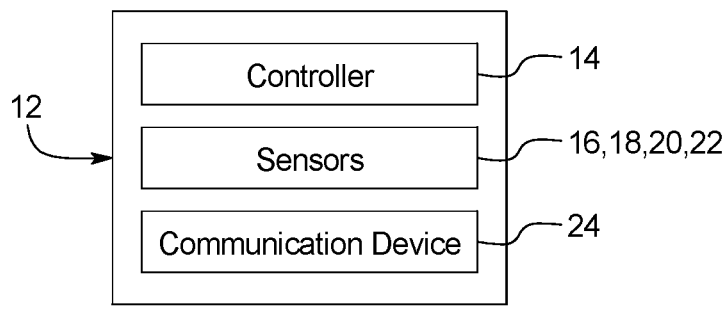
FIG. 2 is a schematic view of the vehicle control system shown in FIG. 1.

As shown in FIGS. 1 and 2, the vehicle control system 12 includes a controller 14, a pair of front vehicle sensors 16 and 18, a pair of rear vehicle sensors 20 and 22 and a communication device 24. The vehicle control system 12 is in communication with a navigation device 26, a display 28, a data storage device 30 and a GPS tracker 32. Thus, the vehicle control system 12 is a vehicle-mounted device that communicates with other components of the host vehicle 10 to control the driving parameters of the host vehicle 10 in accordance with a selected one of the predetermined driving modes. The driving modes are prestored in memory of the controller 14.

The controller 14 includes a processor 34 with a control program that controls the vehicle control system 12 as discussed below. The processor 34 can be part of a microcomputer. The controller 14 can also include other conventional components such as an input interface circuit, an output interface circuit, and storage devices, such as a ROM (Read Only Memory) device and a RAM (Random Access Memory) device. The processor 34 is programmed to control one or more of the navigation device 26, the display 28, the data storage device 30, and the operation of the host vehicle 10, and to make determinations or decisions, as discussed herein. The memory circuit stores processing results and control programs that are run by the processor circuit, such as processing results and control programs for the navigation device 26, the display 28, the data storage device 30 and the electrical systems of the vehicle that are necessary or desired for vehicle operation. The controller 14 is operatively coupled to the navigation device 26, the display 28, the data storage device 30 in a conventional manner, as well as other electrical systems in the vehicle, such as the turn signals, windshield wipers, lights, any system or device necessary or desired for vehicle operation (autonomous or otherwise), such as the brakes and the steering control system, and any other suitable systems. Such a connection enables the controller 14 to monitor and control any of these systems as desired. The internal RAM of the controller 14 stores statuses of operational flags and various control data. The internal ROM of the controller 14 stores the information for various operations. The controller 14 is capable of selectively controlling any of the components of the vehicle control system 12 in accordance with the control program. It will be apparent to those skilled in the art from this disclosure that the precise structure and algorithms for the controller 14 can be any combination of hardware and software that will carry out the functions of the present invention.

The vehicle sensors 16, 18, 20 and 22 are configured to detect at least one object in proximity to the vehicle 10. For example, as illustrated in FIG. 1, the vehicle sensors 16, 18, 20 and 22 are preferably mounted externally on front quarter panels 36a and 36b and rear quarter panels 38a and 38b of the host vehicle 10. However, the vehicle sensors 16, 18, 20 and 22 can be mounted on any suitable external portion of the host vehicle 10, including the front and rear bumpers, the external mirrors or any combination of suitable areas. The vehicle sensors 16, 18, 20 and 22 transmit data to the controller 14, which is then capable of using the sensor data to detect the social place in which the vehicle is located.

The vehicle sensors 16, 18, 20 and 22 can be any type of sensors desirable. For example, the front vehicle sensors 16 and 18 can include a long-range radar device for object detection in front of the host vehicle 10. The front vehicle sensors 16 and 18 can be configured to detect objects at a predetermined distance (e.g., distances up to 200 m), and thus may have a narrow field of view angle (e.g., around 15°). Due to the narrow field of view angle, the long range radar may not detect all objects in the front of the host vehicle 10. Thus, if desired, the front vehicle sensors 16 and 18 can include short-range radar devices to assist in monitoring the region in front of the host vehicle 10. The rear vehicle sensors 20 and 22 can include short-range radar devices to assist in monitoring oncoming traffic beside and behind the host vehicle 10. Placement of the aforementioned sensors permits monitoring of traffic flow including remote vehicles and other objects around the host vehicle 10, and the position of the host vehicle 10 with respect to maintaining lane position or lane departure. However, the vehicle sensors 16, 18, 20 and 22 can be disposed in any position on or with respect to the host vehicle 10 and can include any type and/or combination of sensors to enable detection of remote objects. In addition, the vehicle sensors 16, 18, 20 and 22 can be cameras, radar sensors, photo sensors or any combination thereof. Although FIG. 1 illustrates four sensors, 16, 18, 20 and 22, there can be as few or as many sensors as is desirable or suitable.

Although the vehicle sensors 16, 18, 20 and 22 preferably are electronic detection devices that transmit electromagnetic waves (e.g., radar), the vehicle sensors 16, 18, 20 and 22 can be any suitable sensors that, for example, take computer-processed images with a digital camera and analyze the images or emit lasers, as is known in the art. The vehicle sensors 16, 18, 20 and 22 are configured to detect at least the speed, direction, yaw, acceleration and distance of the host vehicle 10 relative to a remote object. Further, the vehicle sensors 16, 18, 20, and 22 can include object-locating sensing devices including range sensors, such as FM-CW (Frequency Modulated Continuous Wave) radars, pulse and FSK (Frequency Shift Keying) radars, sonar and Lidar (Light Detection and Ranging) devices, and ultrasonic devices which rely upon effects such as Doppler-effect measurements to locate forward objects. Object-locating devices can include charged-coupled devices (CCD) or complementary metal oxide semi-conductor (CMOS) video image sensors, and other known camera/video image processors which utilize digital photographic methods to "view" forward objects including one or more remote vehicles. The vehicle sensors 16, 18, 20, and 22 are in communication with the controller 14 and are capable of transmitting information to the controller 14. Therefore, the controller 14 can determine whether the remote objects detected by the vehicle sensors 16, 18, 20, and 22 are pedestrians or remote vehicles, and the controller 14 can also determine the amount of vehicle traffic and the amount of pedestrian traffic based on the information received from the vehicle sensors 16, 18, 20, and 22.

As shown in FIGS. 1 and 2, the host vehicle 10 also includes a communication device 24 in communication with the controller 14. The communication device 24 is configured to communicate wirelessly over one or more communication paths. Examples of communication paths include a cellular telephone network, a wireless network (WiFi or a WiMAX), a DSRC (Dedicated Short-Range Communications) network, a power line communication network, etc.

The communication device 24 is preferably configured to receive information from local knowledge sources and to transmit such information to the controller 14. For example, the communication device 24 can be configured to wirelessly receive information about events scheduled in a given local area from a subscribed local knowledge source via a service provider.

The communication device 24 is also configured to receive information from mobile applications, such as social media applications, that are connected to the host vehicle 10 and to transmit such information to the controller 14. For example, the communication device 24 can be configured to wirelessly receive information about Facebook and/or Twitter check-ins for various locations in a given area when a mobile phone with the Facebook and/or Twitter applications is connected to the host vehicle 10.

As shown in FIG. 1, the navigation device 26 is in communication with the controller 14. For example, in the illustrated embodiment, the navigation device 26 is configured to receive information from the controller 14 about a suggested driving route for the host vehicle 10. The suggested driving route for the host vehicle 10 can be determined based on information received by the controller 14 from a mobile application connected to the host vehicle 10 and/or a driving mode of the host vehicle 10 as determined using any of the herein described methods, devices or systems. The navigation device 26 can also be configured to display the suggested driving route to a driver inside the host vehicle 10.

The display 28 is preferably a text display that is disposed inside the host vehicle 10 (e.g., on the dashboard 40) so as to be capable of selectively indicating a driving mode of the host vehicle 10. Thus, the display 28 can display, in text, a plurality of driving modes that indicate a preferred driving state of the host vehicle 10. For example, in one mode, the display 28 can display "SMALL URBAN DOWNTOWN" indicating that the host vehicle 10 is in a driving state that includes reducing the speed of the host vehicle 10 below the speed limit, anticipating active start/stop of the host vehicle 10 and turn taking with pedestrians and remote vehicles. In another mode, the display 28 can display "NORMAL MODE," indicating that the host vehicle 10 is in a driving state that includes traveling at the speed limit and using normal detection modes for the vehicle sensors 16, 18, 20 and 22.

As mentioned above, the data storage device 30 is in communication with the controller 14. The data storage device 30 can store information such as map data, traffic data, including data regarding both pedestrian and vehicle traffic, and date and time information. Thus, in determining the driving mode of the host vehicle 10 using any of the herein described methods, devices or systems, the controller 14 can compare the location of the host vehicle 10 to the known map data stored in the data storage device 30 to determine when the host vehicle 10 is in proximity to a cross walk, a stop sign, an intersection or any other area in which a remote vehicle or pedestrian (i.e., external object) may cross near or in front or the host vehicle 10. A remote vehicle can be any type of vehicle on the road, including but not limited to automobiles, trucks, bicycles, and any other vehicles. Furthermore, in determining the driving mode of the host vehicle 10 using any of the herein described methods, devices or systems, the traffic data for the current date and time of the host vehicle 10 can be compared to the known traffic data for a prior date and time of the host vehicle 10 to determine a trend in traffic.

The data storage device 30 can also store data from local knowledge sources. For example, data from local knowledge sources includes data from a local calendar of events, data from a local news source, data from a local sports arena, data from a local concert venue or data from or regarding any other type of local venue. The data from the local knowledge sources can include information regarding a scheduled start time for a local event, a number of seats in the local venue or a number of tickets sold for a local event.

Moreover, as illustrated in FIGS. 1 and 2 and as mentioned above, the GPS tracker 32 is in communication with the controller 14. In the illustrated embodiment, the host vehicle 10 receives a GPS satellite signal from the GPS tracker 32. In a conventional manner, the GPS tracker 32 obtains the GPS satellite signal to determine positional information (such as location, speed, acceleration, yaw, and direction, just to name a few) of the host vehicle 10. As noted herein, the GPS tracker 32 is configured to transmit such positional information regarding the host vehicle 10 to the controller 14.

Figure 3:
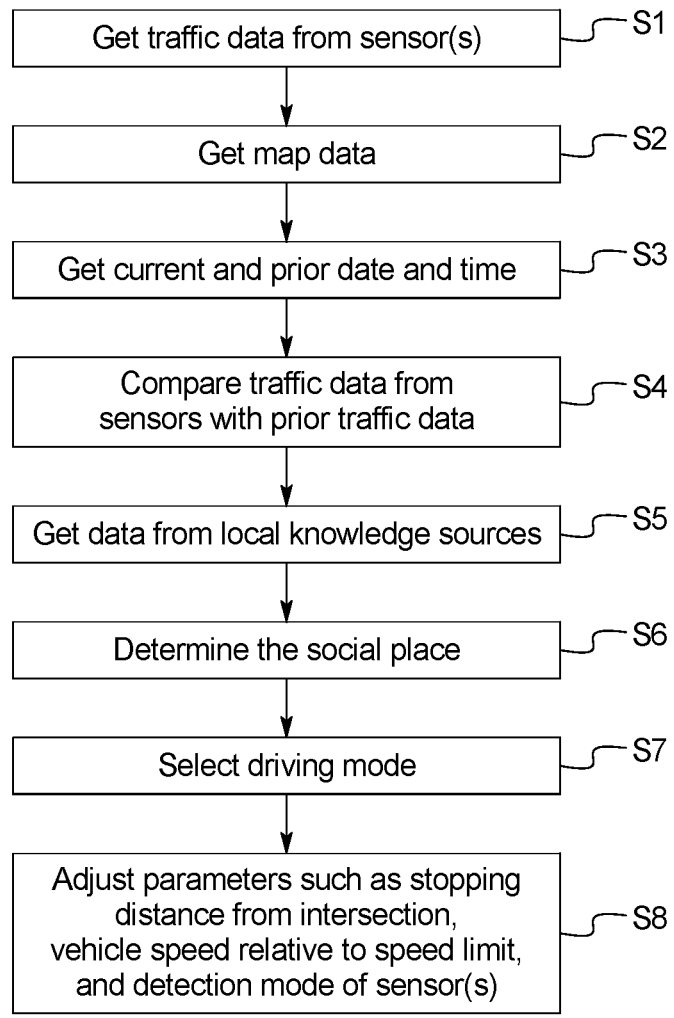
FIG. 3 is a simplified flow chart illustrating a control operation executed by the controller in the vehicle control system shown in FIG. 1.

FIG. 3 illustrates an exemplary procedure in which the controller 14 of the vehicle control system 12 determines the social place of the host vehicle 10 and selects the driving mode of the host vehicle 10 based on the social place that was determined.

First in step S1, the controller 14 gets current traffic data from the vehicle sensors 16, 18, 20 and 22. As discussed previously, the traffic data from the vehicle sensors 16, 18, 20 and 22 preferably includes data regarding both pedestrian and vehicle traffic. The controller 14 then retrieves map data from the communication device 24 or the data storage device 30. For example, the map data can be obtained via a wireless network by the communication device 24 or can be map data stored from a previous trip by the host vehicle 10. Based on the map data and data from the GPS tracker 32, the controller 14 can determine the current location of the host vehicle 10.

In step S3, the controller 14 gets the current date and time and proceeds to step S4. The controller 14 then in step S4 compares the current traffic data associated with the current date and time with historical traffic data for similar times and days of the week. The historical traffic data can be retrieved from the data storage device 30 and/or downloaded by the communication device. By comparing the current traffic data, such as current vehicle and pedestrian traffic data, with historical traffic data, the controller 14 can determine whether the traffic is heavier or lighter than at a previous time for the same day and the same time of day.

The controller 14 then gets data from local knowledge sources in step S5. As discussed previously, data from local knowledge sources preferably includes data from a local calendar of events, data from a local news source, data from a local sports arena, data from a local concert venue or data from or regarding any other type of local venue. The data from the local knowledge sources can include among other things information regarding a scheduled start time for a local event, a number of seats in the local venue or a number of tickets sold for a local event. The controller 14 can get the data from local knowledge sources from the communication device 24, and the communication device 24 can get the data from local knowledge sources via wireless communication with a subscribed local knowledge source via a service provider. For example, the communication device 24 can retrieve information from a subscription to a local news provider for an area in the vicinity of the current location of the host vehicle 10. In another embodiment, the communication device 24 can retrieve information regarding a local calendar of events using the Internet to search for local calendars of events for an area in the vicinity of the current location of the host vehicle 10.

The controller 14 can also get data from mobile applications connected to the host vehicle 10. For example, the communication device 24 is configured to wirelessly receive information about Facebook and/or Twitter check-ins for various locations in an area in the vicinity of the current location of the host vehicle 10 and transmit such information to the controller 14.

In step S6, the controller 14 determines the social place of the host vehicle 10 at the current time. For example, the social place of the host vehicle 10 can be a busy downtown area at a time when an event is scheduled at a nearby designated event center or pedestrian and/or vehicle traffic in the area is otherwise expected to increase based on information from social media applications connected to the host vehicle 10, a college campus when classes are in session and it is a weekday morning or afternoon around the start or end time of typical class schedules or at a time when pedestrian and/or vehicle traffic is otherwise expected to increase based on information from social media applications connected to the host vehicle 10, a rural route at a time when pedestrian and/or vehicle traffic in the area is otherwise expected to stay the same or decrease based on information from social media applications connected to the host vehicle 10, an area where a sporting event is scheduled at a nearby designated event center when temporary road configurations and parking practices are in effect, or a school zone at a time when students are scheduled to be dropped off or picked up and/or vehicle traffic in the area is otherwise expected to increase based on information from social media applications connected to the host vehicle 10.

The controller 14 determines the social place of the host vehicle 10 based on the information from the local knowledge sources and/or the information from the mobile applications connected to the vehicle. For example, the controller 14 can determine that the social place of the host vehicle 10 is a "sporting event venue" based on the amount of Facebook check-ins at a nearby sports venue or information from a local knowledge source indicating that a sporting event is scheduled for a designated location in the vicinity of the current location of the host vehicle 10 at a time within a predetermined amount of time before or after the current time. The controller 14 can also determine the host vehicle 10 has entered the social place based on information from the vehicle sensors 16, 18, 20 and 22. Thus, the controller 14 can determine the social place of the host vehicle 10 based on the vehicle and pedestrian traffic data obtained by the vehicle sensors 16, 18, 20 and 22 or based on information obtained from the vehicle sensors 16, 18, 20 and 22 regarding the conditions of a road on which the host vehicle 10 is traveling.

Based on the social place of the host vehicle 10 determined in step S6, the controller 14 will then select a driving mode in step S7. For example, the driving mode is preferably selected from among a plurality of predetermined driving modes stored in the memory of the controller 14. For example, the driving mode can be selected from among the following modes: "small urban downtown," "high pedestrian traffic event venue," "normal drive," "school zone" and "low traffic interstate." The driving mode is selected by the controller 14 based on the social place of the vehicle determined in step S6. In particular, the controller 14 uses an algorithm to determine the most appropriate driving mode from among the predetermined driving modes based on certain characteristics or parameters of the social place determined in step S6. The controller 14 is then programmed to select the driving mode that was determined to be the most appropriate based on the characteristics or parameters of the social place determined in step S6. For example, the controller 14 can be programmed to select "low traffic interstate" driving mode when the social place of the vehicle is determined to be a rural route at a time when pedestrian and/or vehicle traffic in the area is otherwise expected to stay the same or decrease based on information from social media applications connected to the host vehicle 10. Alternatively, the controller 14 can be programmed to select "high pedestrian traffic event venue" driving mode when the social place of the host vehicle 10 is determined to be an area where an event is scheduled at a nearby designated event center when temporary road configurations and parking practices are in effect. The controller 14 can also be programmed to select "school zone" driving mode when the social place of the host vehicle 10 is determined to be a school zone area at a time when students are scheduled to be dropped off or picked up or pedestrian and/or vehicle traffic in the area is otherwise expected to increase based on information from social media applications connected to the host vehicle 10.

In step S8, the controller 14 then adjusts certain parameters of the vehicle control system 12 based on the driving mode selected in step S7. For example, when the controller 14 selects the "small urban downtown" driving mode, the controller 14 increases the stopping distance of the host vehicle 10 from an intersection detected by sensors 16, 18, 20 and 22, decreases the speed of the host vehicle 10 relative to a speed limit for the current location in which the host vehicle 10 is traveling, and adjusts a detection mode of the vehicle sensors 16, 18, 20 and 22 to account for an actual or anticipated increase in pedestrian and vehicle traffic.

Figure 4:
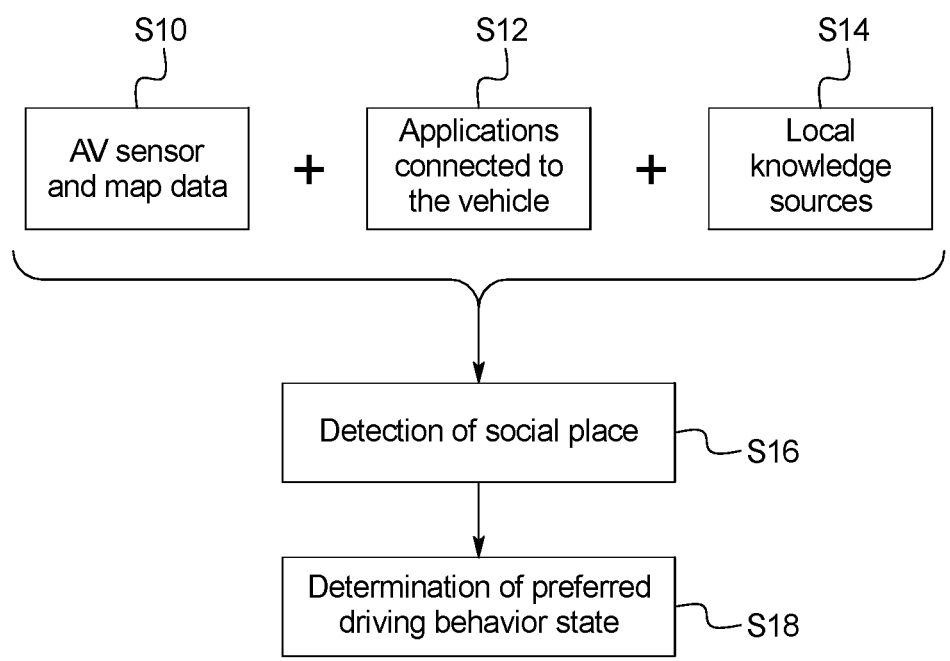
FIG. 4 is a simplified flow chart illustrating a method of determining a preferred driving behavior state for the vehicle control system shown in FIG. 1.

FIG. 4 shows a method of determining a preferred driving behavior state for the vehicle control system 12 of FIGS. 1 and 2. As shown in step S10, the method includes gathering autonomous vehicle ("AV") sensor and map data for the host vehicle 10. For example, the data obtained in step S10 includes information regarding pedestrian and vehicle traffic and/or remote objects detected by the vehicle sensors 16, 18, 20 and 22. In the illustrated embodiment, the data obtained in step S10 also includes map data obtained from the communication device 24 or the data storage device 30. As discussed above, the data obtained in step 10 can be transmitted to the controller 14 from the vehicle sensors 16, 18, 20 and 22, the communication device 24 and/or the data storage device 30.

In step S12, data is obtained from applications connected to the vehicle, such as mobile social media applications like Facebook and Twitter. Data is also obtained from local knowledge sources as shown in step S14. As discussed above, the data obtained in steps S12 and S14 can be obtained wirelessly by the communication device 24 and then transmitted to the controller 14.

The social place of the host vehicle 10 is then detected in step S16 based on the sensor and map data obtained in step S10, the data from applications connected to the vehicle obtained in step S12, and the data from local knowledge sources obtained in step S14. As discussed above, the social place of the host vehicle 10 can be, for example, a "busy downtown" area, a "college campus" when students are expected to be heading to or from class, a "rural route," a "designated event venue" at a time when temporary road configurations and parking practices are in effect, or a "school zone" at a time when children are expected to be dropped off or picked up. The controller 14 determines the social place of the host vehicle 10 based on the sensor and map data obtained, the data obtained from applications connected to the host vehicle 10, and the data from local knowledge sources.

As shown in step S18, the preferred driving behavior state of the host vehicle 10 is determined based on the detected social place. For example, the driving mode of the vehicle control system 12 is selected based on the detected social place. As discussed above, the driving mode is preferably selected from among a plurality of predetermined driving modes, such as "small urban downtown," "high pedestrian traffic event venue," "normal drive," "school zone" and "low traffic interstate."

Figure 5:
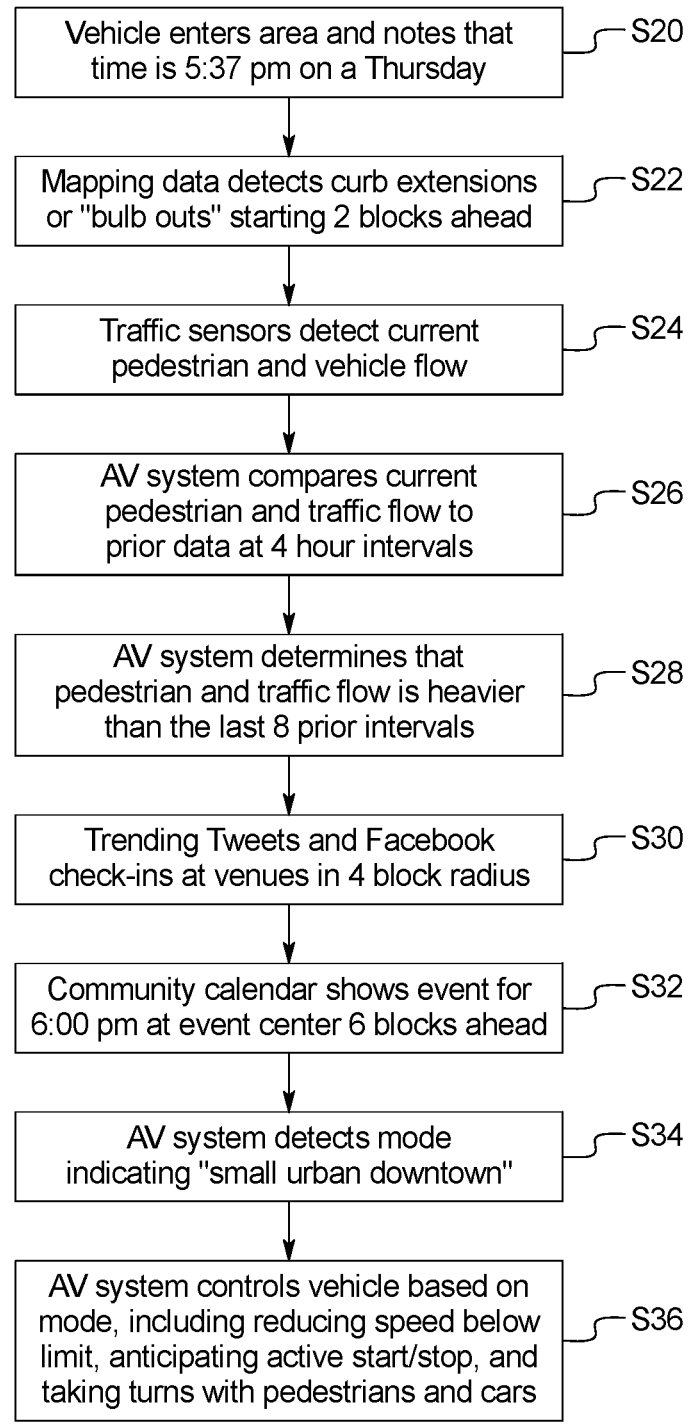
FIG. 5 is a flow chart illustrating a method executed by the controller in the vehicle control system shown in FIG. 1 in one illustrated situation.
Figure 6:
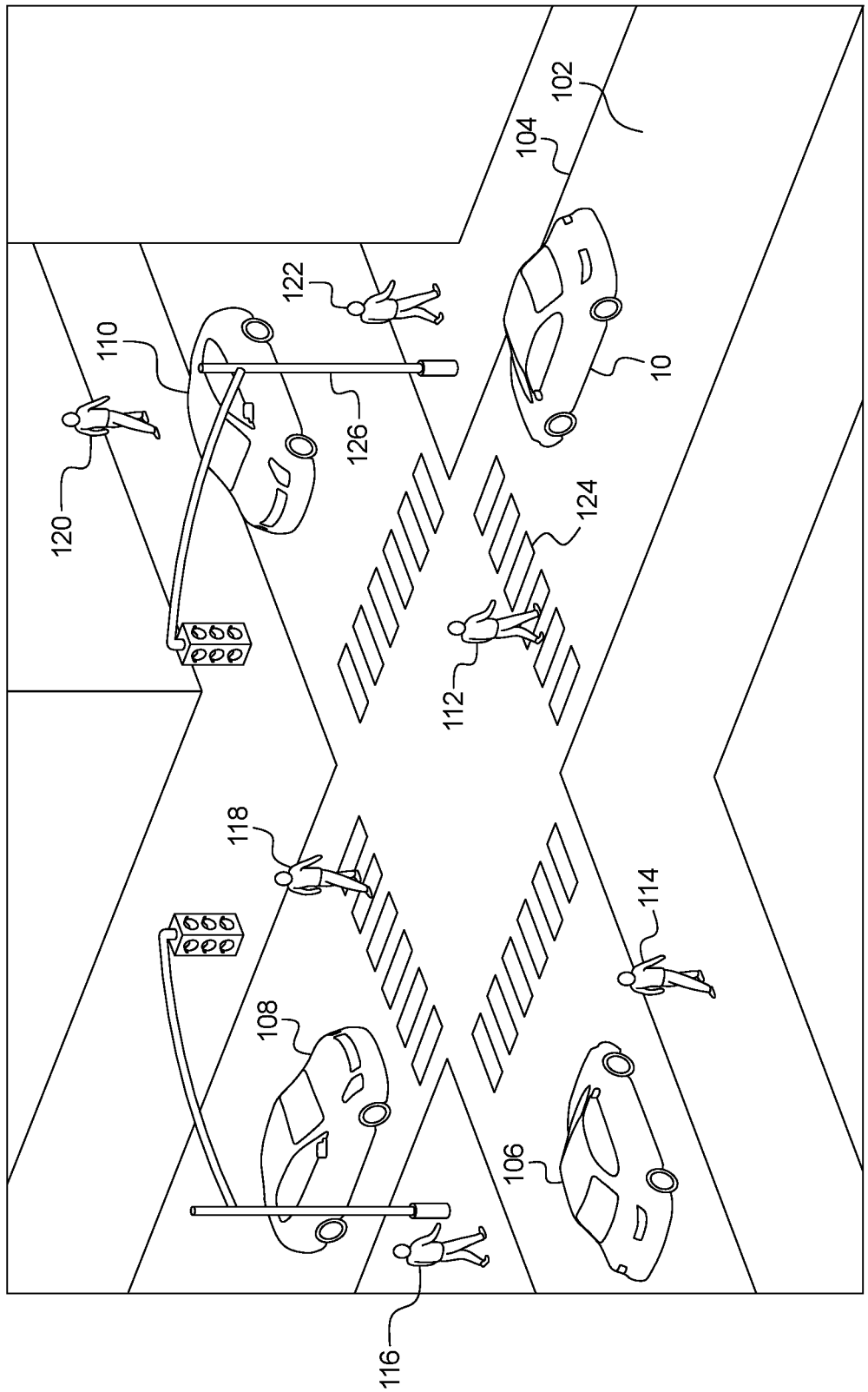
FIG. 6 is a perspective view of a driving environment corresponding to the method illustrated in FIG. 5.

FIG. 5 shows a method executed by the controller in the vehicle control system shown in FIG. 1 in a situation shown in FIG. 6. In FIG. 5, the term "AV system" refers to the vehicle control system 12. However, it should be understood that the vehicle control system can be any suitable vehicle control system and is not limited to an autonomous vehicle ("AV") control system.

As shown in FIG. 6, the host vehicle 10 is traveling along a road 102. In step S20, the host vehicle 10 enters the environment/area shown in FIG. 6 and determines that the current time is 5:37 pm on a Thursday. The host vehicle 10 then retrieves map data in step S22 that indicates curb extensions or "bulb outs" of the curb 104 will be starting two blocks ahead of the host vehicle 10 based on the direction of travel of the host vehicle 10 along the road 102.

In step S24, the host vehicle 10 detects current pedestrian and vehicle traffic flow using traffic sensors. In the illustrated embodiment, the traffic sensors can be mounted on the exterior of the host vehicle 10 to detect remote objects such as pedestrians and remote vehicles. For example, as shown in FIG. 6, the traffic sensors of the host vehicle 10 detect the remote vehicles 106, 108, and 110, as well as the pedestrians 112, 114, 116, 118, 120 and 122. One or more of the vehicle sensors 16, 18, 20 and 22 of the host vehicle 10 can be traffic sensors, or the traffic sensors can be provided on the host vehicle 10 in addition to the vehicle sensors 16, 18, 20 and 22.

As shown in step S26, the vehicle control system 12 of the host vehicle 10 compares current pedestrian and traffic flow detected in step S24 with prior data at four-hour intervals regarding the pedestrian and traffic flow in the area shown in FIG. 6. For example, the prior data can be stored in the data storage device 30 within the host vehicle 10 or obtained using the communication device 24 of the host vehicle 10.

In step S28, the vehicle control system 12 determines that the current pedestrian and traffic flow detected in step S24 is heavier than the last eight prior intervals of traffic data.

As shown in step S30, the vehicle control system 12 also obtains data regarding trending Tweets and Facebook check-ins at venues within a four-block radius of the area shown in FIG. 6. However, it should be understood that although step S30 shows obtaining data regarding the social media applications of Twitter and Facebook, the data obtained in step S30 can also include data from other mobile applications connected to the host vehicle 10, such as LinkedIn, Pinterest, Instagram, and YouTube.

In addition, in step S32, the vehicle control system 12 obtains data from a community calendar of events for a community in the vicinity of the area shown in FIG. 6. As shown in step S32, the community calendar of events shows an event for 6:00 pm at an event center six blocks ahead of the current location of the host vehicle 10.

Based on the information obtained in steps S22, S28, S30 and S32, the vehicle control system 12 detects a driving mode indicating "small urban downtown" in step S34. The "small urban downtown" driving mode can be selected by the vehicle control system 12 from among a plurality of predetermined driving modes.

Then in step S36, the vehicle control system 12 controls the host vehicle 10 based on the "small urban downtown" driving mode detected in step S34. In particular, the vehicle control system 12 reduces or otherwise controls the speed of the host vehicle 10 to be below the speed limit for the area in which the host vehicle 10 is traveling. The vehicle control system 12 also controls the host vehicle 10 to anticipate active start/stop with remote vehicles such as vehicles 106, 108 and 110. In addition, the vehicle control system 12 controls the host vehicle 10 to take turns with pedestrians and other vehicles such as vehicles 106, 108 and 110. In illustrated embodiment, the vehicle control system 12 can also control the host vehicle 10 to increase the stopping distance from the crosswalk 124 and/or to decrease the speed of the host vehicle 10 as it approaches the stoplight 126.

Figure 7:
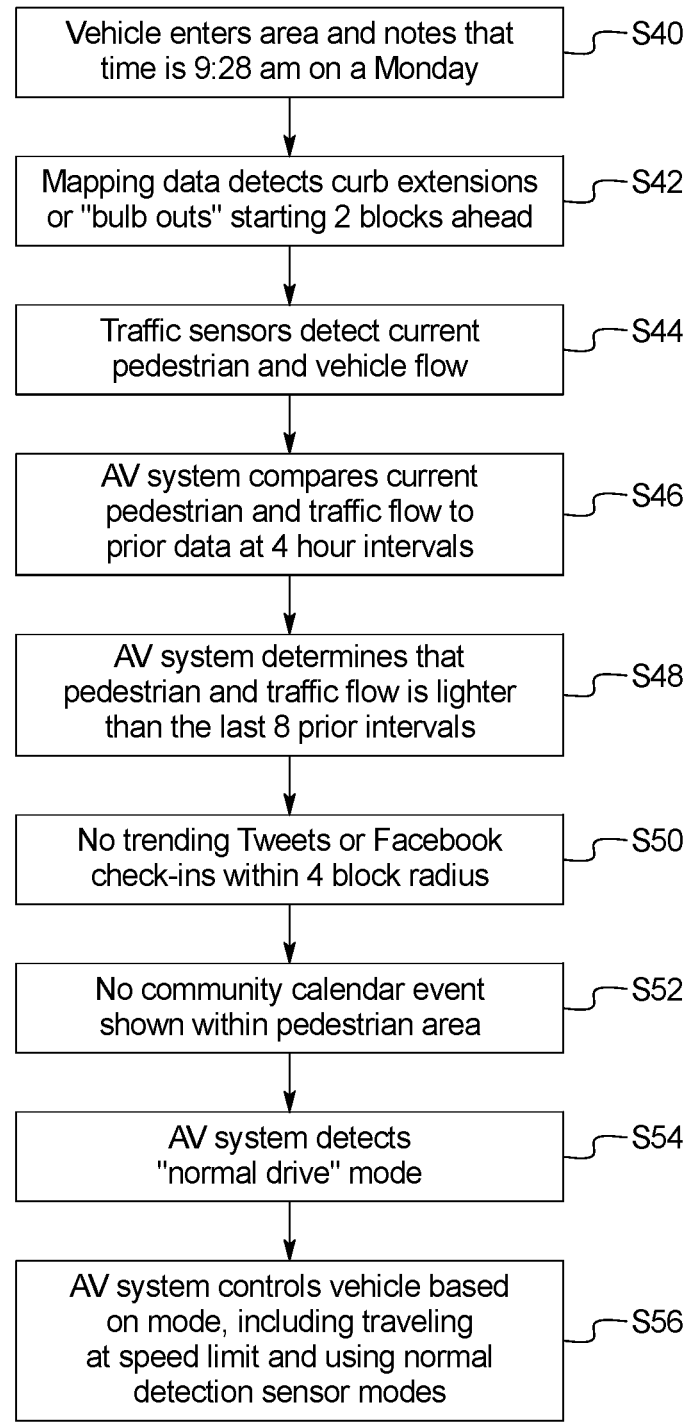
FIG. 7 is a flow chart illustrating a method executed by the controller in the vehicle control system shown in FIG. 1 in another illustrated situation.
Figure 8:
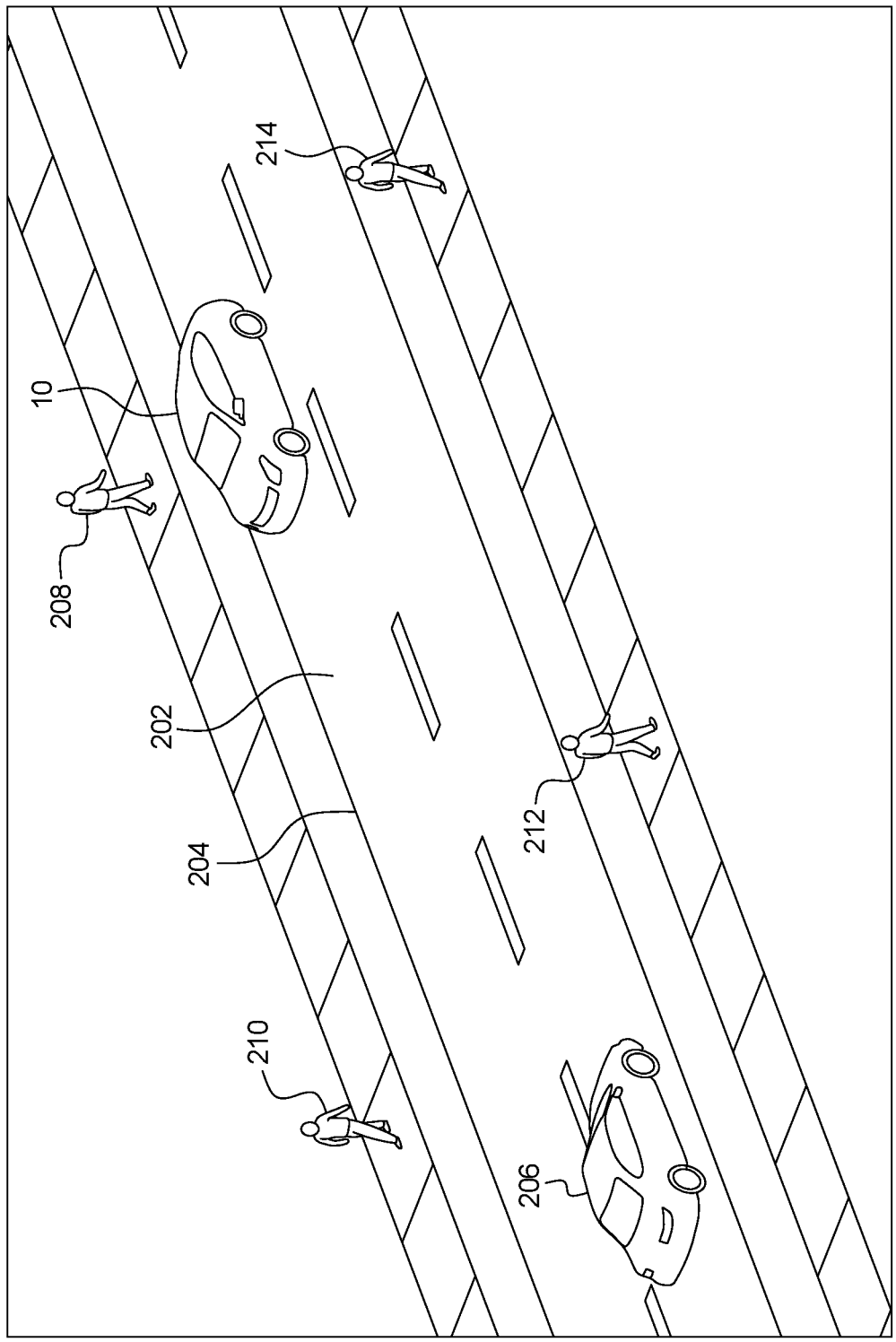
FIG. 8 is a perspective view of a driving environment corresponding to the method illustrated in FIG. 7.

FIG. 7 shows a method executed by the controller in the vehicle control system shown in FIG. 1 in a situation shown in FIG. 8. Here in FIG. 8, the host vehicle 10 is traveling along a road 202. In step S40, the host vehicle 10 enters the environment/area shown in FIG. 8 and determines that the current time is 9:28 am on a Monday. The host vehicle 10 then retrieves map data in step S42 that indicates curb extensions or "bulb outs" of the curb 204 will be starting two blocks ahead of the host vehicle 10 based on the direction of travel of the host vehicle 10 along the road 202.

In step S44, the host vehicle 10 detects current pedestrian and vehicle traffic flow using traffic sensors. For example, the traffic sensors can be mounted on the exterior of the host vehicle 10 to detect remote objects such as pedestrians and remote vehicles. For example, as shown in FIG. 8, the traffic sensors of the host vehicle 10 detect the remote vehicle 206 and the pedestrians 208, 210, 212 and 214. One or more of the vehicle sensors 16, 18, 20 and 22 of the host vehicle 10 can be traffic sensors, or the traffic sensors can be provided on the host vehicle 10 in addition to the vehicle sensors 16, 18, 20 and 22.

As shown in step S46, the vehicle control system 12 of the host vehicle 10 compares current pedestrian and traffic flow detected in step S44 with prior data at four-hour intervals regarding the pedestrian and traffic flow in the area shown in FIG. 8. For example, the prior data can be stored in the data storage device 30 within the host vehicle 10 or obtained using the communication device 24 of the host vehicle 10.

In step S48, the vehicle control system 12 determines that the current pedestrian and traffic flow detected in step S44 is lighter than the last eight prior intervals of traffic data.

As shown in step S50, the vehicle control system 12 also obtains data regarding trending Tweets and Facebook check-ins at venues within a four-block radius of the area shown in FIG. 8. However, it should be understood that although step S50 shows obtaining data regarding the social media applications of Twitter and Facebook, the data obtained in step S50 can also include data from other mobile applications connected to the host vehicle 10, such as LinkedIn, Pinterest, Instagram, and YouTube.

In addition, in step S52, the vehicle control system 12 obtains data from a community calendar of events for a community in the vicinity of the area shown in FIG. 8. As shown in step S52, the community calendar of events does not show any events within a predetermined pedestrian area of the host vehicle 10.

Based on the information obtained in steps S42, S48, S50 and S52, the vehicle control system 12 detects a driving mode indicating "normal drive" in step S54. The "normal drive" driving mode can be selected by the vehicle control system 12 from among a plurality of predetermined driving modes.

Then in step S56, the vehicle control system 12 controls the host vehicle 10 based on the "normal drive" driving mode detected in step S54. In particular, the vehicle control system 12 reduces or otherwise controls the speed of the host vehicle 10 to be at the speed limit for the area in which the host vehicle 10 is traveling. The vehicle control system 12 also controls the host vehicle 10 to use normal detection modes for the vehicle sensors 16, 18, 20 and 22.

The vehicle control system 12 described herein improves the social intelligence of vehicles, in particular, autonomous vehicles, to more closely imitate an actual human driver. The vehicle control system can therefore anticipate the socially appropriate driving behavior for a given locale in advance of actually detecting remote objects using sensors and merely reacting to the remote objects, therefore improving the safety of the vehicle.

The navigation device 26 and the GPS tracker 32 are conventional components that are well known in the art. Since navigation devices and GPS trackers are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "social place" as used herein refers to a particular environment having met prescribed characteristics that are not detectable by merely using on-board vehicle sensors, historical traffic data and/or pre-defined map boundaries but would be identifiable by a human driver that is familiar with the environment. In particular, the term "social place" refers to a description of a driving environment based on information from local knowledge sources for the area, including whether or not there is an event scheduled in the area on or around the time the vehicle is traveling in the area and/or whether there has been or will be an occurrence that otherwise affects the driving conditions in the area on or around the time the vehicle is traveling in the area, and/or information from social media or other mobile applications that could affect the driving conditions in the area on or around the time the vehicle is traveling in the area. For example, a "social place" could include a busy downtown area during an evening when there is a sporting event scheduled and heavy pedestrian and vehicle traffic is expected on or around the time that the sporting event is scheduled. A "social place" could also include a college campus with predictable but variable class schedules at an "off-season" time when most students are not expected to be on campus.

The term "local knowledge source" as used herein refers to non-vehicle sensor data and non-traffic detected data. In other words, the term "local knowledge source" as used herein includes information relating to an area in which a vehicle is traveling that is not obtained via on-board vehicle sensors of the host vehicle 10 and/or on-board vehicle sensors of remote vehicles. The term "local knowledge source" as used herein also excludes historical traffic data. For example, a "local knowledge source" can be a community calendar of events for a given locale or a local news source.

The term "controller" as used herein refers to a component, a device or a group of devices that directs or controls the operation of a vehicle, and does not include a person.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts. Also as used herein to describe the above embodiments, the following directional terms "forward," "rearward," and "above," as well as any other similar directional terms refer to those directions of a vehicle equipped with the vehicle state indication system. Accordingly, these terms, as utilized to describe the present invention should be interpreted relative to a vehicle equipped with the vehicle control system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle control system configured to be disposed on a host vehicle, the vehicle control system comprising:
   a communication device configured to receive information from at least one of a mobile application connected to the host vehicle and a local knowledge source, the local knowledge source including information relating to an area in which the host vehicle is traveling that is not obtained via a vehicle sensor;
a sensor configured to detect external conditions in a vicinity of the host vehicle equipped with the vehicle control system, the external conditions including data regarding at least one of pedestrian traffic and vehicle traffic in the vicinity of the host vehicle; and
a controller programmed to:
determine a social place, the social place being a driving environment having met prescribed characteristics that are not detectable by merely using on-board vehicle sensors, historical traffic data or pre-defined map boundaries but would be identifiable by a human driver that is familiar with the driving environment, based on the data regarding at least one of pedestrian traffic and vehicle traffic detected by the sensor, and further based on the information received from at least one of the mobile application connected to the host vehicle and the local knowledge source;
select a driving mode based on the social place that was determined; and
control the host vehicle based on the driving mode that was selected,
wherein the social place is determined from among a predetermined group of driving environment descriptions, and the social place is further determined based on information that is not obtained from vehicle sensors and that does not include the data regarding at least one of pedestrian traffic and vehicle traffic in the vicinity of the host vehicle.

2. The vehicle control system according to claim 1, wherein
the communication device is configured to receive information regarding a location of the host vehicle equipped with the vehicle control system.

3. The vehicle control system according to claim 1, further comprising
a data storage device configured to store data, wherein
the controller is configured to receive map data from at least one of the communication device and the data storage device.

4. The vehicle control system according to claim 3, wherein
the communication device is configured to receive real time traffic information as the map data.

5. The vehicle control system according to claim 3, wherein
the controller is further programmed to determine the social place based on the map data.

6. The vehicle control system according to claim 1, further comprising
a data storage device configured to store detected vehicle traffic data detected by the sensor and historical vehicle traffic data from at least one of data received by the communication device and data detected by the sensor, and
the controller being further programmed to:
compare the historical vehicle traffic data corresponding to a first time with the detected traffic data detected by the sensor at a second time occurring after the first time, and
select the driving mode based on a comparison result of comparing the historical vehicle traffic data at the first time with the detected vehicle traffic data at the second time.

7. The vehicle control system according to claim 1, wherein
the mobile application is a social media application.

8. The vehicle control system according to claim 1, wherein
the local knowledge source includes at least one of a local calendar of events, a local traffic application, and a local news publication for the area in which the host vehicle is traveling.

9. The vehicle control system according to claim 1, wherein
the controller is further programmed to control the host vehicle based on the driving mode by automatically adjusting at least one of a stopping distance from an intersection, a stopping distance from a crosswalk, an acceleration of the host vehicle, a traveling distance between the host vehicle and other vehicles, a vehicle speed of the host vehicle relative to a speed limit, and a detection mode of the sensor.

10. The vehicle control system according to claim 1, wherein
the driving mode is selected from among a plurality of predetermined driving modes.

11. The vehicle control system according to claim 1, wherein
the social place is determined based on the information from both the mobile application connected to the host vehicle and the local knowledge source.

12. A vehicle control method comprising:
detecting data regarding at least one of pedestrian traffic and vehicle traffic in a vicinity of a host vehicle using a sensor;
determining a social place, the social place being a driving environment having met prescribed characteristics that are not detectable by merely using on-board vehicle sensors, historical traffic data or pre-defined map boundaries but would be identifiable by a human driver that is familiar with the driving environment, based on the data regarding at least one of pedestrian traffic and vehicle traffic detected by the sensor, and further based on information from at least one of a local knowledge source and a mobile application connected to the host vehicle, the local knowledge source including information relating to an area in which the host vehicle is traveling that is not obtained via a vehicle sensor;
selecting a driving mode based on the social place that was determined; and
controlling the host vehicle based on the driving mode that was selected,
wherein the social place is determined from among a predetermined group of driving environment descriptions, and the social place is further determined based on information that is not obtained from vehicle sensors and that does not include the data regarding at least one of pedestrian traffic and vehicle traffic in the vicinity of the host vehicle.

13. The vehicle control method according to claim 12, further comprising
receiving information regarding a location of the host vehicle.

14. The vehicle control method according to claim 12, further comprising
receiving map data.

15. The vehicle control method according to claim 14, wherein
the map data includes real time vehicle traffic information.

16. The vehicle control method according to claim 14, further comprising
determining the social place based on the map data.

17. The vehicle control method according to claim 12, further comprising
comparing historical vehicle traffic data corresponding to a first time with detected traffic data detected by the sensor at a second time occurring after the first time, and
the selecting of the driving mode being based on a comparison result of comparing the historical traffic data at the first time with the detected vehicle traffic data at the second time.

18. The vehicle control method according to claim 12, wherein
the mobile application is a social media application.

19. The vehicle control method according to claim 12, wherein
the local knowledge source includes at least one of a local calendar of events, a local traffic application, and a local news publication for the area in which the host vehicle is traveling.

20. The vehicle control method according to claim 12, wherein
the controlling of the vehicle based on the driving mode includes automatically adjusting at least one of a stopping distance from an intersection, a stopping distance from a crosswalk, an acceleration of the host vehicle, a traveling distance between the host vehicle and other vehicles, a vehicle speed of the host vehicle relative to a speed limit, and a detection mode of the sensor.

21. The vehicle control method according to claim 12, wherein
the driving mode is selected from among a plurality of predetermined driving modes.

22. The vehicle control method according to claim 12, wherein
the social place is determined based on the information from both the mobile application connected to the host vehicle and the local knowledge source.

* * * * *